(No Model.)
Z. T. WILSON.
HUB FOR VEHICLE WHEELS.
No. 505,740. Patented Sept. 26, 1893.
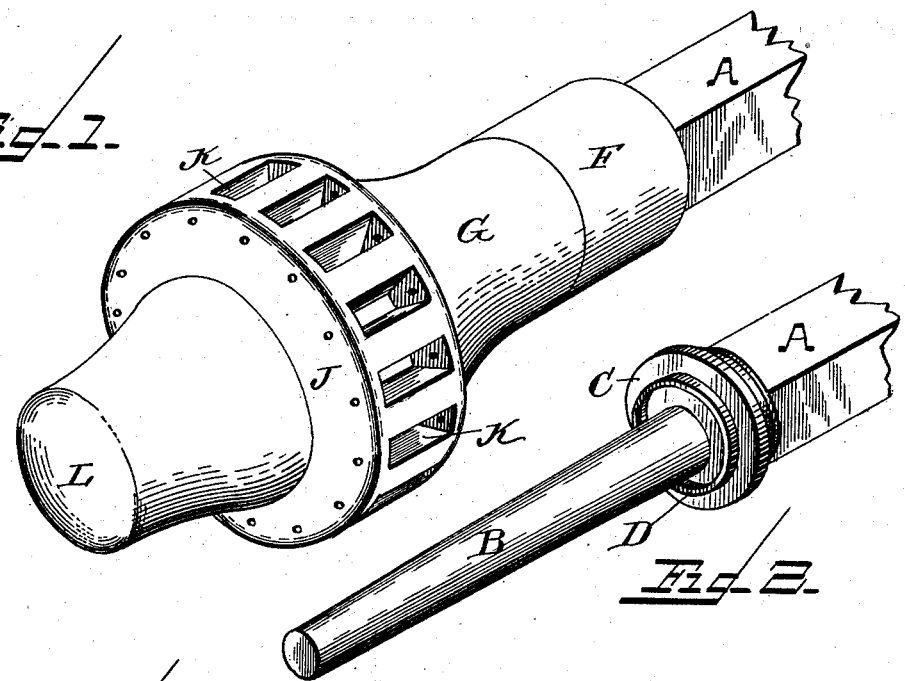
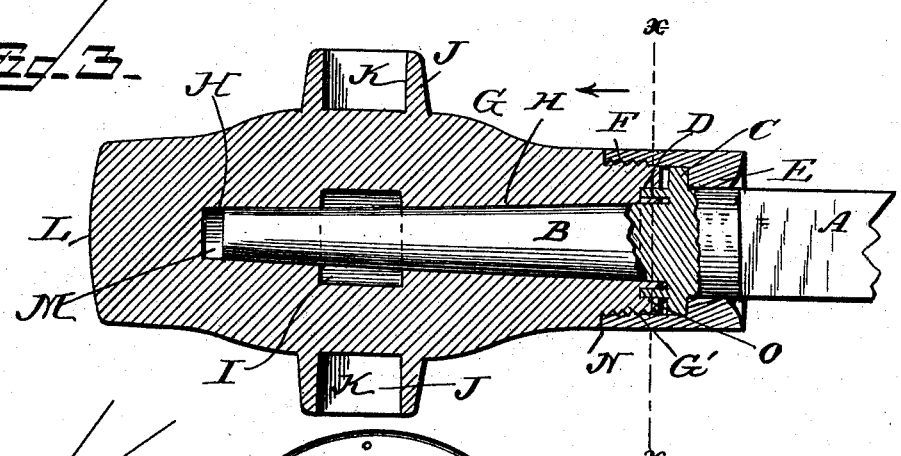
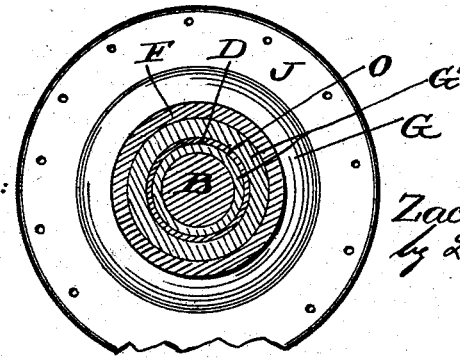
WITNESSES:
INVENTOR:
Zachary T. Wilson
by Louis Bagger & Co.
his Attorneys.

UNITED STATES PATENT OFFICE.

ZACHARY T. WILSON, OF INVERNESS, FLORIDA.

HUB FOR VEHICLE-WHEELS.

SPECIFICATION forming part of Letters Patent No. 505,740, dated September 26, 1893.

Application filed April 24, 1893. Serial No. 471,677. (No model.)

*To all whom it may concern:*

Be it known that I, ZACHARY T. WILSON, a citizen of the United States, and a resident of Inverness, in the county of Citrus and State of Florida, have invented certain new and useful Improvements in Hubs for Vehicle-Wheels; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved hub with the spokes removed. Fig. 2 is a perspective view of the outer end of the axle and spindle, with the hub and its "take-up-wear" collar removed. Fig. 3 is a longitudinal sectional view through the axis of the spindle, hub, and collar; and Fig. 4 is a view of the device in transverse section, on the vertical plane indicated by the broken lines marked x—x in Fig. 3.

Like letters of reference denote corresponding parts in all the figures.

This invention relates to metallic hubs for vehicle-wheels, and has for its object to construct a hub which shall combine lightness and inexpensiveness of construction with the greatest possible amount of strength and durability.

With this object in view, my improvement consists in the specific construction and combination of parts of the all-metal hub, spindle, and "take-up-wear" collar, which will be hereinafter more fully described and claimed.

At the outset I may state, that my improved hub is cast in one piece of any suitable metal, preferably malleable cast-iron. The spindle and collar, with its nut for taking up wear, are also of metal; the whole operative device consisting of only three parts or pieces, all of metal, viz: the hub proper, the spindle (which forms the outer end of the axle), and the nutted collar. On the example shown in the drawings, I have shown my improved hub as adapted for wooden spokes; but it will be obvious that by suitably altering the construction of the spoke-mortises, or spoke-seats, it may also be adapted for use with metallic spokes, if so desired, without departing from the spirit of my improvement.

Referring to the drawings, the letter A denotes the axle, the outer end of which is turned off to form the tapering spindle B, which is divided from the axle proper by a circular flange C, having, on the side facing the hub, an inwardly projecting annular flange D, which forms the sand-band, so-called. The inner end of the hub is screw-threaded, to receive the interiorly threaded flange or nut E of a cylindrical collar, F.

The hub proper consists of the nave or axle-box G, having the usual central tapering bore, H, for the insertion of the spindle; said bore being enlarged at its middle part so as to form an oil-chamber, I, around the middle part of the spindle. The box G is cast integral with a circumferential spoke-seat J, which is provided with equi-distant tapering spoke-sockets K to fit the wedge-shaped inner ends of the spokes (not shown). The outer end of the box, unlike most axle-boxes, is made solid and without an opening; its extreme outer end being rounded off, as shown at L. When the spindle has been inserted into its bore or recess H within the box, there is an open space, M, left between its outer end and the end of the bore, to permit of the proper adjustment of the spindle to take up wear, as will be hereinafter more fully set forth. The inner end G' has cut into its face a circular groove or recess, O, concentric with the bore H and of such width that it will receive and fit loosely upon the inwardly projecting circular flange or sand-band D appertaining to the spindle. When the several parts are combined, it will be seen (Fig. 3) that the collar F will overlap and protect the sand-band and its recess O, thus forming a double protection against grit or dirt entering the bore and oil-chamber within it.

If it is desired to take up wear after the hub has been continuously used for a long time, all that is necessary is to screw up the collar F by means of its nut E.

It will be observed that my improved hub is exceedingly simple in construction, that the component parts of the device are easily put together and adjusted, and that all the parts (being of metal) are very strong and durable. One of the chief advantages of this hub is, that it has no "nose-band" or nut at its outer end; the hub being held in place simply and solely by the screw-collar E F, so that there is no nut to work loose and drop off, and no opening to permit the entrance of snow or dirt into the box. The end L, being solid and rounded, will withstand buffeting and usage of the roughest kind, as when, for example, used on timber wagons for hauling logs through the woods, or on caissons and pieces of field-ordnance.

Having thus described my invention, I claim and desire to secure by Letters Patent of the United States—

1. The improved all-metal hub for vehicles herein described, comprising the axle-box G having oil-chamber I, a solid closed and rounded outer end L, and at its inner open end formed with a screw threaded extension G′, in combination with the spindle B having flange C provided with the circular sand-band D, and collar F having annular nut or flange E adapted to be screwed up upon the hub so as to bear against the spindle-flange C and recessed box-extension, substantially as and for the purpose herein shown and set forth.

2. As an improved article of manufacture, an all-metal hub-body for vehicle-wheels having a central tapering bore enlarged midway of its length to form an oil-chamber or receptacle, and closed at its outer end, said closed end being made solid and rounded; substantially as and for the purpose herein shown and specified.

In testimony that I claim the foregoing as my own I have hereunto affixed my signature in presence of two witnesses.

ZACHARY T. WILSON.

Witnesses:
   C. M. DU PREE,
   GEO. E. FEARING.